April 8, 1924.
W. H. WILKINSON
VEHICLE STABILIZER
Filed April 16, 1921
1,489,336
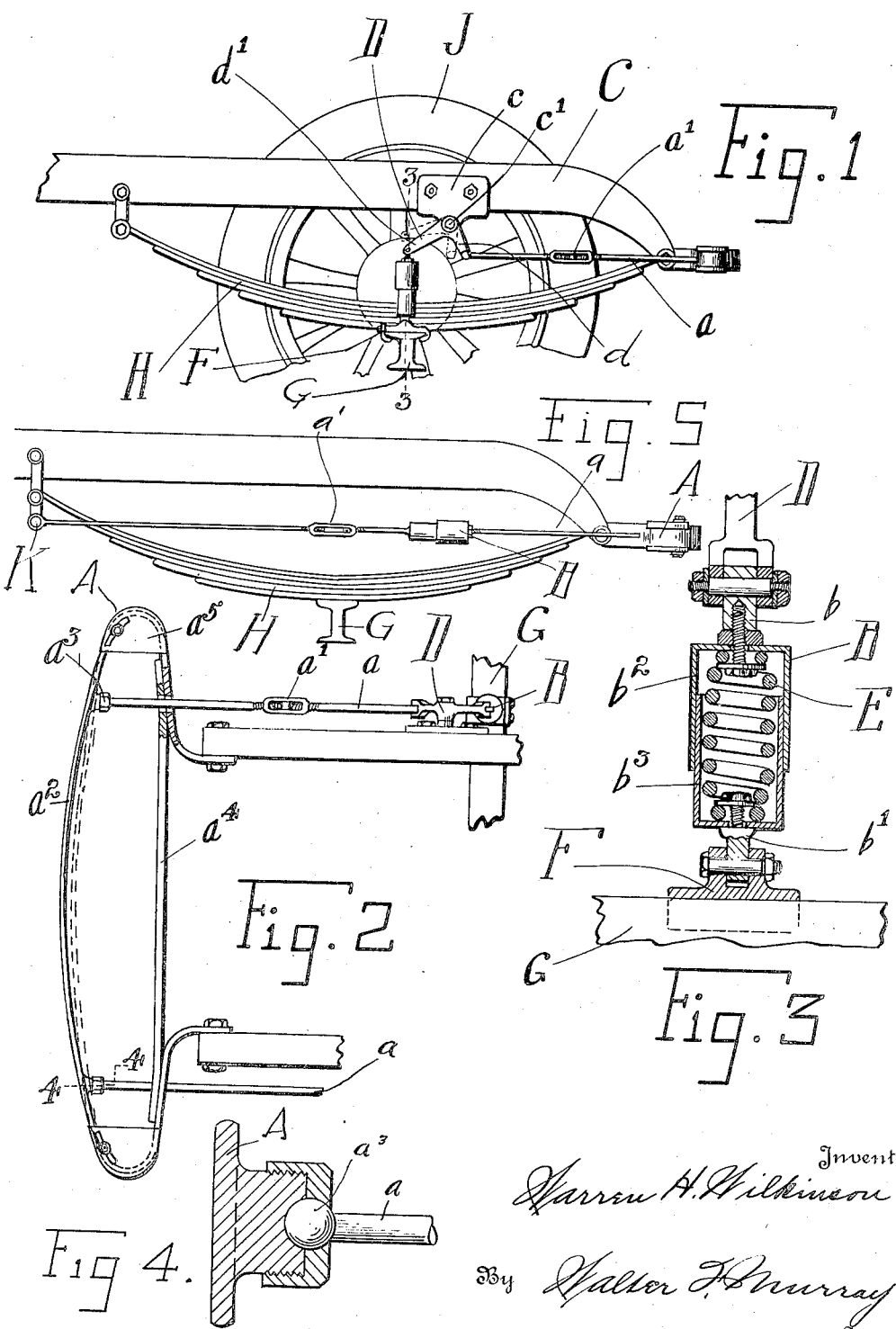

Patented Apr. 8, 1924.

1,489,336

UNITED STATES PATENT OFFICE.

WARREN H. WILKINSON, OF HAMILTON, OHIO.

VEHICLE STABILIZER.

Application filed April 16, 1921. Serial No. 461,800.

*To all whom it may concern:*

Be it known that I, WARREN H. WILKINSON, a citizen of the United States of America, and a resident of Hamilton, in the county of Butler and State of Ohio, have invented a new and useful Improvement in a Vehicle Stabilizer, of which the following is a specification.

An object of my invention is to provide a vehicle stabilizer wherein shock received by any one of the elements is met by the co-operative action of all the elements thereof.

Another object is to provide a stabilizer adapted to function as a combined shock absorber and bumper, and wherein the several vibrating elements have dissimilar periods of vibration whereby the several parts co-operate in meeting and neutralizing the effect of any pressure or force directed against any one of the elements thereof.

These and other objects are attained by the means described herein and disclosed in the accompanying drawings, in which—

Fig. 1 is a fragmental side elevation of a vehicle having a device embodying my invention mounted thereon.

Fig. 2 is a plan view of parts of the device shown in Fig. 1.

Fig. 3 is an enlarged view on line 3—3 of Fig. 1.

Fig. 4 is a cross section view on line 4—4 of Fig. 2.

Fig. 5 is an elevational view of a modified form of device embodying my invention.

I have shown my device as mounted upon the forward end of an automobile, although it may be applied to both the fore and rear of any vehicle.

My invention comprises an ordinary bumper A mounted upon a frame C of an automobile and being operatively connected with a housing B containing a spring, which housing is operative upon the vehicle axle to which is affixed the main spring H. The bumper A is mounted upon the frame C in a manner that is common in the art. A lever mounting comprising a plate $c$ is mounted upon the frame C and has pivotally mounted upon the lugs $c'$ formed thereon, a bell crank lever D, having one arm $d$ thereof connected with the cross bar or cross member $a^2$ of the bumper A by means of a connecting rod $a$. The rod $a$ may be made sectional whereby it may be adjustably extended longitudinally by means of a turn buckle $a'$. The other arm $d'$ of the bell crank lever is pivotally mounted upon a block $b$ to which is secured one end of an auxiliary or intermediate spring E. The other end of the spring E is secured upon a block $b'$ pivotally mounted upon a bracket F mounted upon the vehicle axle G. The housing B comprises the telescopic members $b^2$ and $b^3$ which encase the spring E and which are mounted upon the blocks $b$ and $b'$ respectively. The vehicle main spring H is mounted upon the axle G as is common in the art and supports the frame C in a manner well known and common in the art. The spring E is normally under a slight tensional strain. The forward end of the rod $a$ is pivotally mounted upon the forward member $a^2$ of the bumper by any suitable means such as a ball and socket joint $a^3$ adapted to permit slight relative movement of the bumper and the rod $a$. The bumper A is normally under a strain which tends to move the rod towards the bell crank lever D. This is more clearly explained by referring to Fig. 2 wherein the dotted lines show the normal position of the bumper when disconnected from the rod $a$. The normal action of the springs upon one another serves normally to retain the spring E under a slight tensional strain and retains the bumper under strain as shown in Fig. 2. The bell crank lever permits equalization of the strains between the springs, whereby the bumper and spring E co-operatively resist the normal downward pressure of the spring H upon the axle G. The bumper spring's period of vibration is relatively the longest, being determined by the distance transverse thereof. On some types of bumpers it may be necessary to prevent any but a transverse vibration by means of a bar $a^4$ and plates $a^5$.

The operation of my device is as follows:

We will assume that the vehicle is moving and that the wheel J thereof drops into a rut or a hole in the roadway. The axle G drops with the wheel, and the spring E and bumper cooperatively resist dropping of the axle, both springs E and A being placed under greater strain, and co-operatively resisting a further drop of the axle, thereby eliminating the sharp precipitation of the vehicle body evidenced by jolting. The tendency of the bumper to assume an unstrained position, as shown in the dotted lines in Fig. 2, causes the bell crank lever (see Fig. 1) to move in a clockwise direction, thereby augmenting the tensional strain on the spring E. This co-operation between the springs in their joint action upon the axle G serves to absorb and neutralize the jolt accompanying the drop of the wheel and axle. When the wheel J encounters a projection on the roadway, or leaves the rut, the axle G tends to move upward against the spring H and increasing the strain thereon, whereupon the spring E assumes its normally unstrained position and thereupon goes into compression, whereupon this strain is directed upon the bumper A by the action of the bell crank lever and the rod a. The bumper A passes through its normally unstrained position and then again goes into strain, being moved to the rear of the dotted line shown in Fig. 2, wherefor the bumper and spring E co-operatively resist further movement of the axle. The action of the main spring H is therefore augmented in resisting the upward movement of the axle. When the axle tends to return to its normal position after the wheel has either dropped into a rut or has encountered an obstruction, the inequality of vibration of the main spring H, the spring E and the bumper spring A causes the several springs to counteract a tendency of any one spring to vibrate in any extended degree of continuity, wherefor the jolting, rocking and jumping ordinarily accompanying the contact of the wheel J with a rough and uneven roadway are eliminated to a great extent. Should the bumper H contact any foreign body, the original impact of such body upon the bumper co-operates with the bumper in its tendency to move against the action of the spring, therefor the blow of contact will not be as sharp as otherwise would result, therefor the jolt upon the foreign object and upon the vehicle will not be as disastrous as would otherwise result.

In the modified form, the lever K supercedes the bell crank lever D. In this construction the relative strains and stresses are modified to an extent that is equivalent to inserting the intermediate spring between the bumper spring and the bell crank lever. On the upward movement of the axle, the intermediate spring is normally under compression instead of tension. In this construction the bumper spring normally assumes approximately the position shown in dotted lines in Fig. 2, and therefore both the intermediate spring and the bumper spring are placed under strain on the upward movement of the axle. In other words they unitedly oppose upward movement of the axle. When the axle drops, they resist dropping thereof, and the bumper is moved toward the position shown in full lines in Fig. 2.

What I claim is:

1. A vehicle stabilizer comprising the combination of a vehicle main spring mounted on a vehicle axle and supporting a vehicle body, a bumper spring mounted upon the vehicle, an intermediate spring operative on the vehicle axle and a connector operative upon the bumper spring and the intermediate spring.

2. A vehicle stabilizer comprising the combination of a main spring mounted on a vehicle axle and supporting a vehicle body, a bumper spring mounted upon the vehicle, a telescopic housing mounted pivotally at one end upon the main spring, a pivotally mounted lever pivotally mounted upon the other end of the housing, a spring encased within the housing having its ends secured upon the opposite ends of the housing, and a rod connecting the lever and the bumper spring.

3. A vehicle stabilizer comprising the combination of a vehicle main spring mounted on a vehicle axle and supporting a vehicle body, a bracket mounted on the axle, a block pivotally mounted on the bracket, a bell crank lever mounted pivotally on the vehicle body, a block mounted pivotally upon one arm of the lever, a spring mounted intermediate the blocks and adapted to be tensioned and compressed therebetween, a bumper spring mounted on the body, and a rod pivotally mounted upon the bumper spring and the second arm of the lever.

4. A vehicle stabilizer comprising the combination of a vehicle main spring mounted on a vehicle axle and supporting a vehicle body, a bracket mounted on the axle, a block pivotally mounted on the bracket, a bell crank lever mounted pivotally on the vehicle body, a block mounted pivotally upon one arm of the lever, a spring mounted intermediate the blocks and adapted to be tensioned and compressed therebetween, a telescopic housing having its ends mounted upon the blocks and encasing the last mentioned spring, a bumper spring mounted on the body, and a rod pivotally mounted upon the bumper spring and the second arm of the lever.

WARREN H. WILKINSON.